United States Patent [19]

Yamada et al.

[11] Patent Number: 5,051,287

[45] Date of Patent: Sep. 24, 1991

[54] MAGNETIC DISK HAVING A MAGNETIC LAYER COMPRISING A BINDER AND FERROMAGNETIC PARTICLES OF SPECIFIED CRYSTALLITE SIZE AND SURFACE AREA AND IN WHICH THE MECHANICAL LOSS TANGENT, TAN DELTA, IS WITHIN A SPECIFIED RANGE

[75] Inventors: Yasuyuki Yamada; Mikihiko Kato; Yasuhi Endo; Masaya Kojima; Yasuo Nagashima, all of Kanagawa, Japan

[73] Assignee: Fuji Photo Film Co., Ltd., Kanagawa, Japan

[21] Appl. No.: 424,445

[22] Filed: Oct. 20, 1989

[30] Foreign Application Priority Data

Oct. 20, 1988 [JP] Japan .................................. 63-265056

[51] Int. Cl.$^5$ ............................................. G11B 23/00
[52] U.S. Cl. ..................... 428/64; 428/694; 428/900; 428/425.9
[58] Field of Search ..................... 428/900, 694, 425.9, 428/64

[56] References Cited

U.S. PATENT DOCUMENTS

| | | | |
|---|---|---|---|
| 4,520,070 | 5/1985 | Yamamoto et al. | 428/336 |
| 4,659,626 | 4/1987 | Fukushima et al. | 428/425.9 |
| 4,741,977 | 5/1988 | Koga et al. | 428/694 |
| 4,863,793 | 9/1989 | Ogawa et al. | 428/323 |

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic disk comprising a nonmagnetic support having provided thereon a magnetic layer comprising a ferromagnetic metal powder and a binder resin, wherein the magnetic layer has a mechanical loss tangent, tan $\delta$, of from $8 \times 10^{-3}$ to $6 \times 10^{-2}$, measured at a frequency of 110 Hz and in a temperature range of from 20° to 50° C. with a temperature increase rate of 2 deg/min.

11 Claims, 1 Drawing Sheet

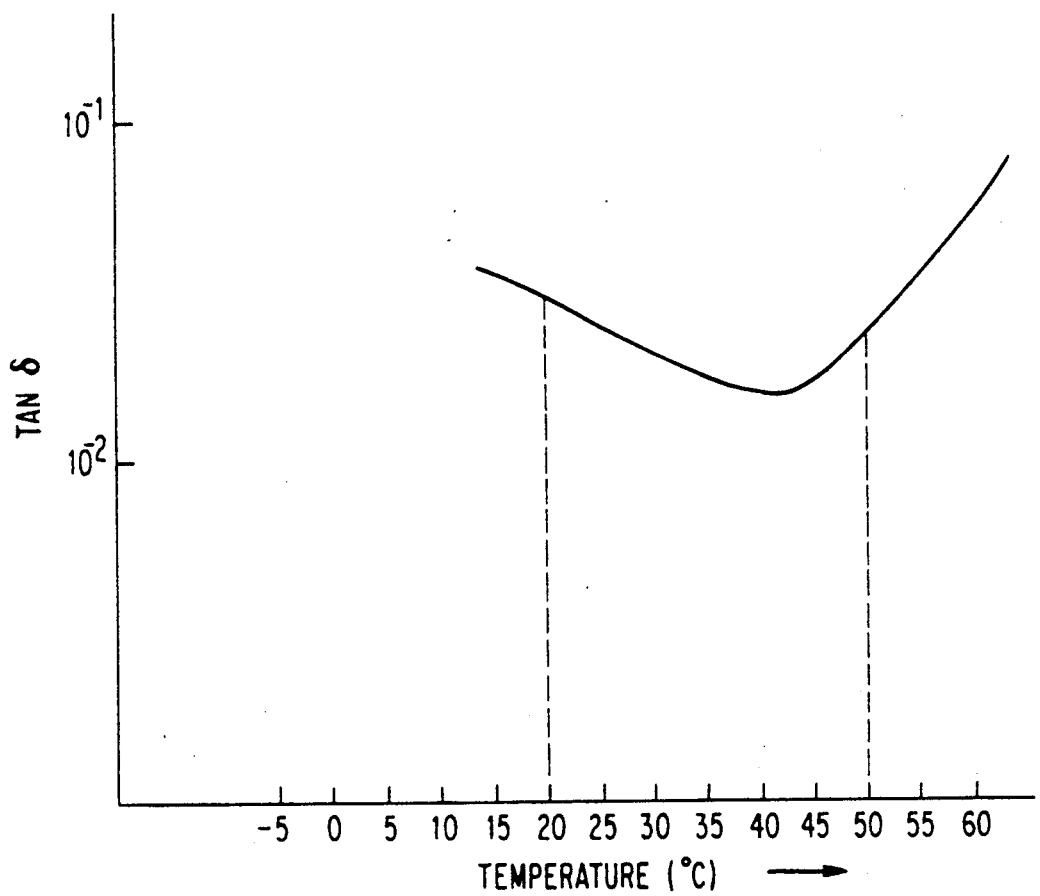

MAGNETIC DISK HAVING A MAGNETIC LAYER COMPRISING A BINDER AND FERROMAGNETIC PARTICLES OF SPECIFIED CRYSTALLITE SIZE AND SURFACE AREA AND IN WHICH THE MECHANICAL LOSS TANGENT, TAN DELTA, IS WITHIN A SPECIFIED RANGE

FIELD OF THE INVENTION

This invention relates to a magnetic recording medium, and in particular, it relates to a magnetic disk having excellent running durability.

BACKGROUND OF THE INVENTION

With the recent spread of personal computers, word processors, etc., among the general public, magnetic recording media including magnetic disks are required to be of higher quality.

Particularly, there is a growing desire for magnetic disks which can record information at high densities. For the purpose of making magnetic disks for high-density recording, methods are employed, in which ferromagnetic particles having a small particle size are used, ferromagnetic metal particles are used as ferromagnetic particles, or ferromagnetic particles are dispersed more uniformly in magnetic layers. Whichever method is selected, the surfaces of magnetic layers need to be smooth so as to diminish spacing losses caused by the spacing between magnetic head and magnetic layer. However, as a result of a smoother surfaces of magnetic layers, the coefficient of the friction between such magnetic layers during running and parts of recording and reproducing devices have become so high that some problems have become conspicuous. That is, for example, the smooth running of the magnetic disk is often inhibited, the magnetic layers tend to suffer damage, and the start of the running of the magnetic disk requires increased torque.

The above-described problems concerning running durability have become more and more serious for rotary recording media such as floppy disks for use in personal computers, word processors or the like, whose magnetic layers are subjected to many repeated head-on-off operations, especially when such operations are conducted at high temperatures or conducted over a long period of time under condition of cyclically varying temperatures, from high temperatures to low temperatures.

A magnetic disk especially suitable for high-density recording is a magnetic disk comprising a ferromagnetic metal powder and a binder (hereinafter referred to as "metal powder-containing magnetic disk"). Since magnetic disks of this type are excellent in coercive force (Hc), saturated magnetization (Bm) and other magnetic properties, they are hopeful as magnetic recording media suitable for high-density recording, and have been already put to practical use as video floppy disks, etc.

The above-described metal powder-containing magnetic disks also have the above-described various problems accompanying high-density recording. That is, the coefficient of friction between the magnetic layers of these disks during running and parts of recording and reproducing devices tend to increase, and this causes problems on running durability. Specifically, the output becomes low, and the magnetic layers suffer damage leading to the clogging of heads and the peeling of the magnetic layers. Particularly, at a high temperature, since the strength of the magnetic layers becomes low, problems sometimes occur such that the magnetic layers are damaged by the liners in the disk jackets or are peeled from the substrates by magnetic heads.

In order to overcome the above problems, various methods have so far been proposed.

For example, methods for adding lubricating agents to magnetic layers include a method in which a polyethylene glycol ester is added (JP-A-57-3225), a method in which a ketone compound is added (JP-A-57-158026), a method in which a glycerol ester of a fatty acid and a sorbitan ester of a fatty acid are added (JP-A-57-158027), a method in which a fatty acid and a fatty acid ester are added (JP-A-58-130435 and JP-A-60-5420) and a method in which an alkyl ester of a fatty acid and an alkoxyl ester of a fatty acid are added (JP-A-61-229234 and JP-A-61-230624) (the term "JP-A" as used herein refers to a "published unexamined Japanese patent application"). However, these methods are disadvantageous in that the regulation of the amount of the lubricating agent(s) added is(are) difficult, and that where the lubricating agent1s) is(are) added in amount(s) to produce desired effects, the magnetic layers often develop low mechanical strength, so that their durability is impaired rather than improved, or there are cases where the magnetic layers adhere to magnetic heads.

Other solutions for the problems concerning running durability are methods wherein abrasive materials are added to magnetic layers. Examples of such methods include a method in which α-ferric oxide is added (JP-A-58-159227), a method in which $Al_2O_3$ is added (JP-A-58-171721) and a method in which 0.2 μm or smaller particles having a Mohs' hardness of 6 or more are added (JP-A-61-289528). However, if such an abrasive material is added in an amount to improve running durability, magnetic heads may abrade quickly or the surface properties of the magnetic layers, are impaired resulting in poor electromagnetic characteristics.

As still other solutions, for example, a method in which an abrasive material is added in combination with a fatty acid ester (JP-A-58-189826) and a method in which carbon black is added in combination with silicone oil (JP-A-62-195730) have been proposed.

All of the above methods, however, are defective in that properties other than running durability are adversely affected, or the running durability of the metal powder-containing magnetic disks cannot be improved to a satisfactory extent, although improved to some extent. In particular, the above methods are almost ineffective in eliminating the problem that the ferromagnetic metal powder falls off the magnetic layers to cause the clogging of heads while the magnetic disks are allowed to run at high temperatures, with many repeated head-on-off operations.

SUMMARY OF THE INVENTION

The present invention has been made in view of the problems accompanying the metal powder-containing magnetic disks produced by the prior art processes described above.

Accordingly, an object of the present invention is to provide a metal powder-containing magnetic disk which shows excellent running durability particularly at high temperatures.

The magnetic disk according to this invention comprises a nonmagnetic support having provided thereon a magnetic layer comprising a ferromagnetic metal powder and a binder resin, wherein the magnetic layer has a mechanical loss tangent, tan $\delta$, of from $8 \times 10^{-3}$ to $6 \times 10^{-2}$, measured at a frequency of 110 Hz and in a temperature range of from 20° to 50° C. with a temperature increase rate of 2 degrees(deg)/min.

BRIEF DESCRIPTION OF THE DRAWING

The Figure is a graph showing the change with temperature of the mechanical loss tangent, tan $\delta$, of the magnetic layer of the magnetic disk prepared in the Example, hereinafter, according to the invention.

DETAILED DESCRIPTION OF THE INVENTION

The magnetic layer comprising ferromagnetic metal powder of the magnetic disk according to this invention is prepared so as to have a specific mechanical property; that is, the magnetic layer has a mechanical loss tangent, tan $\delta$, of from $8 \times 10^{-3}$ to $6 \times 10^{-2}$, measured at a frequency of 110 Hz and in a temperature range of from 20° to 50° C. with a temperature increase rate of 2 deg/min. Due to such a specific magnetic layer, the magnetic disk of this invention exhibits excellent running durability as compared with conventional magnetic disks, particularly at relatively high temperatures such as 40° C. or higher.

Illustratively stated, in the case where the metal powder-containing magnetic disk of this invention is used at a high temperature, the mechanical strength of its magnetic layer becomes low and, as a result, it is difficult for it to cause the surface of the magnetic layer to suffer damage due to friction with the liner in the disk jacket or for the magnetic layer to be shaved by magnetic heads. Most of the causes that bring about the above effects on the magnetic disk of this invention have not yet been elucidated. However, particularly in the case where a magnetic disk contains a ferromagnetic metal powder as a ferromagnetic powder, it can be thought that, of various physical properties of the magnetic layer, the viscosity has a close relationship with the mechanical strength at high temperatures, and when the mechanical loss tangent, tan $\delta$, of the magnetic layer is in the above-specified range, the above-described effects are produced and the magnetic disk can exhibit improved running durability at high temperatures.

The above-described magnetic disk of the present invention can be prepared by various methods, but particularly useful is a method which comprises forming a magnetic layer on a nonmagnetic support using a magnetic coating composition containing the following three ingredients for forming a binder resin:

(1) a vinyl chloride copolymer having, in its molecule, a polar functional group such as —COOM or —SO$_3$M (wherein M represents a hydrogen atom or a metal atom), (2) a polyurethane resin having at least two —OH groups per molecule, and (3) a trifunctional polyisocyanate, die-cutting the resulting layered structure into a disk, and then subjecting the disk to a heat and moisture treatment under the conditions at a temperature of from 60° to 85° C. and an absolute humidity of 0.07 kg.H$_2$O/kg-dry air or more, for example 0.08 to 0.085 kg.H$_2$O/kg-dry air, thereby to obtain a magnetic disk of the present invention.

It is thought that in using the above process for obtaining the magnetic disk of the present invention in which magnetic layer has a mechanical loss tangent, tan $\delta$ of from $8 \times 10^{-3}$ to $6 \times 10^{-2}$ in a temperature range of from 20° to 50° C., all of the following factors may be involved: the crosslinking reaction of the trifunctional polyisocyanate included in the ingredients for forming a binder resin proceeds by the above-described heat and moisture treatment; the dispersion of a ferromagnetic metal powder into the magnetic coating composition is promoted by the presence of the polar functional group in the vinyl chloride copolymer; and the vinyl chloride copolymer per se is excellent in forming a film having good physical properties.

The above-described effect holds only for the magnetic disk in which the ferromagnetic powder contained in the magnetic layer is the ferromagnetic metal powder, as in the present invention, and it does not apply to magnetic disks having iron oxide-type ferromagnetic powder.

If the magnetic layer of the magnetic disk has a mechanical loss tangent, tan $\delta$, larger than $6 \times 10^{-2}$ in a temperature range of from 20° to 50° C., when the magnetic disk is run at a high temperature, troubles tend to arise such as stop page of running due to adhesion of the head to the magnetic layer. This may be because the viscosity in the viscoelastic mechanical properties of the magnetic layer becomes relatively large. On the other hand, if the mechanical loss tangent is smaller than $8 \times 10^{-3}$, this often results, when the magnetic disk is run at a high temperature, in the magnetic layer being shaved by the head or in damage by the liner in the disk jacket. This may be because the viscosity in the viscoelastic mechanical properties of the magnetic layer becomes relatively low, so that the magnetic layer becomes brittle and tends to suffer damage.

The ferromagnetic powder used in the magnetic disk of this invention is required to contain at least Fe. Specifically, the ferromagnetic powder generally is powder of a metal or an alloy and is composed mainly of Fe, Fe-Co, Fe-Ni, Fe-Co-Ni or the like. In order to improve the properties of such ferromagnetic powder, Elements such as B, C, Al, Si and P may be added. In general, the surfaces of the particles of the ferromagnetic metal powder are covered with a layer of an oxide in order to improve the stability of the powder. It is desired that the particles of the ferromagnetic powder have a specific surface area of 40 m$^2$/g or more, for example 40 to 60m$^2$/g, and a crystallite size of 400 Å or less, for example 180 to 400 Å. It is also desired that the particles of the ferromagnetic powder have a ratio of the axial length to the axial width of 5 or more, for example 5 to 8, a saturated magnetization of 110 emu/g or more, for example 110 to 140 emu/g and a coercive force of 800 Oe or more, for example 800 to 1,700 Oe.

The binder resin used in the magnetic disk of this invention is a conventionally known thermoplastic resin, thermosetting resin, reactive resin or mixture thereof. Examples thereof include vinyl chloride-vinyl acetate copolymers, other vinyl chloride copolymers, acrylic ester copolymers, methacrylic ester copolymers, urethane elastomers, cellulose derivatives and epoxypolyamide resins. These polymers may be used in combination with various kinds of polyisocyanates as hardeners.

Preferred of the above-described binder resins are a vinyl chloride copolymer having a polar functional group, a polyurethane resin having at least two —OH groups per molecule, and a trifunctional polyisocyanate, as described hereinbefore. Particularly preferred as the trifunctional polyisocyanate is an addition product formed through the reaction of 1 mol of trimethylpropane with 3 mol of tolylene diisocyanate.

Examples of the polyisocyanate which can be used in preparing the magnetic layer according to the present invention are isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reactions of the above-described isocyanates with polyols, and polyisocyanates produced by the condensation of these isocyanates. Trade name of commercially available polyisocyanates of the above include Coronate L, Coronate HL, Coronate 2030, Coronate 2031, Millionate MR and Millionate MTL (manufactured by Nippon Polyurethane Industry Co., Ltd., Japan); Takenate D-102, Takenate D-110N, Takenate D-200 and Takenate D-202 (manufactured by Takeda Chemical Industries, Ltd., Japan); and Desmodule L, Desmodule IL, Desmodule N, Desmodule HL (manufactured by Sumitomo Bayer Co., Ltd., Japan). These can be used alone or in combination of two or more thereof, taking advantage of the difference in curing reactivity. Further, for the purpose of accelerating the curing reaction, the polyisocyanate may be used in combination with a compound having a hydroxyl group or an amino group. Such a compound desirably is polyfunctional.

The amount of the binder resin contained in the magnetic layer is desirably from 5 to 300 parts by weight per 100 parts by weight of the ferromagnetic metal powder. Further, in order to improve the dispersibility of the ferromagnetic metal powder, it is preferred to introduce a proper proportion of a functional group, such as a carboxyl group, a carboxyl group in the metal salt form, a sulfonic group, a sulfonic group in the metal salt form, a hydroxyl group, an amino group or an epoxy group, into the molecules of the binder resin.

Examples of the nonmagnetic support used in the magnetic disk of this invention are films of various synthetic resins such as polyethylene terephthalate, polycarbonates, polyamides and polyimides, and metal foils such as an aluminum foil and a stainless steel foil.

The magnetic layer in the magnetic disk of this invention may contain a lubricating agent, carbon black and an abrasive material in addition to the above-described ferromagnetic metal powder and binder resin, and in some cases it further contains an antistatic agent, a dispersing agent and other additives.

Examples of the lubricating agent which can be used in the magnetic layer according to the invention are silicone oil, graphite, molybdenum disulfide, boron nitride, graphite fluoride, fluorine-containing alcohols, polyolefins (for example, polyethylene wax), polyglycols (for example, polyethylene oxide wax), an alkyl ester of phosphoric acid, a polyphenyl ether, tungsten disulfide, fatty acid esters comprising a monobasic fatty acid having 10 to 20 carbon atoms and a monohydric alcohol having 3 to 12 carbon atoms or at least one of di-, tri-, tetra- and hexahydric alcohols having 3 to 12 carbon atoms, and fatty acid esters comprising a monobasic fatty acid having 10 or more carbon atoms and a mono- to hexahydric alcohol having carbon atoms such that the total carbon atoms of the fatty acid and alcohol is 11 to 28. Examples of the lubricating agent further include a fatty acid, a fatty acid amide and an aliphatic alcohol, each having 8 to 22 carbon atoms. Specific examples of the above-described organic compound lubricating agents include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol and lauryl alcohol.

Furthermore, so-called lubricating oil additives may be used alone as the lubricating agent for the magnetic layer according to this invention. Examples of such lubricating oil additives include antioxidants (for example, alkylphenols), rust preventives (for example, naphthenic acid, alkenylsuccinic acids, dilauryl phosphate), oiliness improvers (for example, colza oil, lauryl alcohol), extreme pressure additives (for example, dibenzyl sulfide, tricresyl phosphate, tributyl phosphite), detergent dispersing agents, viscosity index improvers, pour point depressants and antifoaming agents. Such a lubricating oil additive is added in an amount of from 0.05 to 20 parts by weight per 100 parts by weight of the binder.

Examples of the dispersing agent which can be used in the magnetic layer according to the invention are fatty acids having 10 to 22 carbon atoms ($R^1COOH$ wherein $R^1$ is an alkyl group having 9 to 21 carbon atoms) such as caprylic acid, capric acid, lauric acid, myristic acid, palmitic acid, stearic acid, oleic acid, elaidic acid, linoleic acid, linolenic acid and stearolic acid; metallic soaps prepared from the above fatty acids and an alkali metal (for example, Li, Na, K), an alkaline earth metal (for example, Mg, Ca, Ba), Cu, Pd, etc.; and lecithin. In addition to the above, higher alcohols having 4 or more carbon atoms (for example, butanol, octyl alcohol, myristyl alcohol, stearyl alcohol), and esters of sulfuric or phosphoric acid with these alcohols can be used. Such a dispersing agent is added in an amount of from 0.005 to 20 parts by weight per 100 parts by weight of the binder.

Methods for adding the dispersing agent to the magnetic layer are not particularly limited, and the dispersing agent may be allowed beforehand to adhere to the surfaces of the ferromagnetic metal powder or nonmagnetic fine powder, or may be added to the ferromagnetic metal powder during dispersion of the ferromagnetic metal powder in the preparation of a magnetic coating composition.

Examples of the antistatic agent are electrically conductive powder such as graphite, carbon black or carbon black graft polymer; natural surface active agents such as saponin; nonionic surface active agents such as the alkylene oxide type, the glycerin type, the glycidol type, polyhydric alcohols, esters of polyhydric alcohols, and an adduct of ethylene oxide with an alkyl phenol; cationic surface active agents such as (higher alkyl) amines, cyclic amines, hydantoin derivatives, amidoamines, ester-amides, quaternary ammonium salts, heterocyclic compounds such as pyridine, and phosphonium or sulfonium compounds; anionic surface active agents containing an acid radical such as a carboxylic acid, sulfonic acid, phosphoric acid, sulfate or phosphate radical; and ampholytic surface active agents such as amino acids, aminosulfonic acids, esters of sulfuric or phosphoric acid with amino-alcohols, and surface active agents of the alkylbetaine type.

Examples of the carbon black which can be used in the magnetic layer according to the invention include furnace black for rubbers, thermal black for rubbers, coloring black and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Carbon blacks which fall under ASTM D-1765-82a can be used. The carbon black which can be used in this invention has an average particle size of from 5 to 1,000 m$\mu$ (electron microscope), a specific surface area as measured by the nitrogen adsorption method cf from 1 to 800 m$^2$/g, a pH of from 4 to 11 (JIS K-6221, 1982), and an oil absorption as measured with dibutyl phthalate of from 10 to 80 ml/100 g (JIS K-6221, 1982).

According to the present invention, carbon black having particle sizes of from 5 to 100 m$\mu$ is used to reduce the surface electric resistance of a coated film, and carbon black of from 50 to 1,000 m$\mu$ is used to adjust the strength of a coated film. Further, fine carbon black of 100 m$\mu$ or smaller may be used to adjust the surface roughness of a coated film so as to smooth the surface and reduce the spacing loss, while coarse carbon black of 50 m$\mu$ or larger may be used to roughen the surface of a coated film so as to decrease its friction coefficient.

The abrasive material which can be used in the magnetic layer of the magnetic disk of this invention is material generally used to abrade or polish and mostly having Mohs, hardnesses of 6 or more. Examples of the abrasive material include $\alpha$-alumina, fused alumina, silicon carbide, chromium oxide, cerium oxide, corundum, artificial diamond, $\alpha$-iron oxide, garnets, emery (main ingredients: corundum and magnetite), silica, silicon nitride, boron nitride, molybdenum carbide, boron carbide, tungsten carbide, titanium carbide, tripoli, diatomaceous earth and dolomite. These abrasive materials are used alone or in combination. The average particle size of the abrasive material is generally from 0.005 to 5 $\mu$m, preferably from 0.05 to 2 $\mu$m. The amount of the abrasive material added to the magnetic layer is generally in the range of from 0.01 to 20 parts by weight per 100 parts by weight of the binder.

The magnetic disk of the present invention is produced, for example, as follows. The above-described various ingredients are kneaded together with an organic solvent, thereby to prepare a magnetic coating composition. The thus-obtained magnetic coating composition is applied on the nonmagnetic support, and subsequently the coating on the support is subjected to orientation, followed by drying and then surface smoothing treatment, thereby to produce a metal powder-containing magnetic recording medium. If desired and necessary, a backing layer may be formed on the side opposite to the magnetic layer.

As the organic solvent, various kinds of organic compounds including methyl ethyl ketone, cyclohexanone, isobutyl alcohol, butyl acetate and toluene can be used. These solvents can be used alone or in combination.

The ingredients are introduced into a kneader at one time or successively and then kneaded to form a dispersion, i.e., a magnetic coating composition.

The thickness of the magnetic layer is generally from 0.5 to 12 $\mu$m.

Further, in the case where the above-described trifunctional polyisocyanate is used in a magnetic coating composition for preparing a magnetic disk of this invention, it is effective that the resulting magnetic disk, which has been obtained by coating the magnetic coating composition, drying the coating, and then die-cutting the resulting layered structure into a disk, is subjected to a heat and moisture treatment. It is desired that this heat and moisture treatment is conducted at a temperature in the range of from 60° to 85° C. and an absolute humidity of 0.07 kg-H$_2$O/kg- dry air or more.

If the temperature for the above treatment of the magnetic disk is below 60° C., the above-described effects of the present invention cannot be expected, while a temperature higher than 85° C. is not preferred because the magnetic disk tend to deform. If the absolute humidity is below 0.07 kg-H$_2$O/kg- dry air, the above-described effects of the present invention cannot be brought about satisfactorily.

Further, it is not advantageous to conduct the above-described heat and moisture treatment on a magnetic recording sheet in the form of a roll in that the effect of the heat and moisture treatment cannot be provided sufficiently and uniformly over the whole magnetic layer and that the bending nature of the thus-treated sheet remains even after it is die-cut into a disk.

As described hereinabove, the magnetic disk of this invention exhibits improved running durability at high temperatures, due to its specific magnetic layer containing a ferromagnetic metal powder and having a mechanical loss tangent, tan $\delta$, of from $8 \times 10^{-3}$ to $6 \times 10^{-2}$, measured at a frequency of 110 Hz and in a temperature range of from 20° to 50° C. with a temperature increase rate of 2 deg/min.

The present invention will be described in more detail by reference to the following Example and Comparative Example, but the Example should not be construed to be limiting the scope of the invention. In the Example and Comparative Example, all parts are by weight unless otherwise indicated.

EXAMPLE

The following ingredients were kneaded for about 1 hour by means of a kneader.

| | |
|---|---|
| Ferromagnetic powder (consisting of 99% Fe and 1% Ni, specific surface area 50 m$^2$/g; coercive force 1,700 Oe; saturated magnetization ($\sigma_s$) 130 emu/g) | 100 parts |
| Vinyl chloride-vinyl acetate copolymer containing —COOH group (MPR-TM, manufactured by Nisshin Chemical Industry Co., Ltd., Japan) | 14 parts |
| Cr$_2$O$_3$ (average particle diameter, 0.5 $\mu$m) | 10 parts |
| Carbon black (average particle diameter, 250 m$\mu$) | 9 parts |
| Methyl ethyl ketone/cyclohexanone = 1/1 (by weight) | 24 parts |

To the resulting mixture were added the following ingredients.

| | |
|---|---|
| Polyester polyurethane (molecular weight, about 50,000) | 6 parts |
| Methyl ethyl ketone/cyclohexanone = 1/1 (by weight) | 167 parts |

Subsequently, the resulting mixture was subjected to a dispersion treatment for about 2 hours by means of a sand grinder (2,000 rpm), thereby obtaining a homogeneous dispersion.

Thereafter, the following ingredients were added to the above-obtained dispersion and they were mixed uniformly, thereby to obtain a magnetic coating composition.

| | |
|---|---|
| Butyl stearate/tridecyl stearate = 1/1 (by weight) | 14 parts |
| Polyisocyanate ("Coronate L" manufactured by Nippon Polyurethane Industry Co., Ltd., Japan) | 16 parts |

The magnetic coating composition thus obtained was applied on both sides of a polyethylene terephthalate film having a width of 30 cm and a thickness of 75 μm in such an amount that the resulting coating layers each had a dry thickness of 2.9 μm, and then dried at about 100° C. The resulting coated film was subjected to calendering at about 40° C. and then rolled. The thus-obtained rolled magnetic recording medium was die-cut into a 3.5 inch floppy disk at 25° C. and 50% RH, thereby obtaining a magnetic disk. Subsequently, a heat and moisture treatment of the magnetic disk sample was conducted by placing the sample for 24 hours in a thermo-hygrostat regulated to have a temperature of 70° C. and a humidity of 30% RH. After the heat and moisture treatment, the resulting 3.5 inch floppy disk sample was evaluated for running durability by the method given later.

On the other hand, a sample for the measurement of mechanical loss tangent, tan δ, was prepared by applying the above-obtained magnetic coating composition on an 18 μm polyethylene terephthalate film at a dry thickness of 18 μm, drying the coated composition, and then subjecting the resulting coated film to the same heat and moisture treatment as described above. The mechanical loss tangent, tan δ, of the magnetic layer of this sample was determined by means of an automatic viscoelastometer manufactured by Toyo Baldwin Co., Ltd., Japan. The results obtained are shown in the Figure. The mechanical loss tangent, tan δ, varied from $1.6 \times 10^{-2}$ to $3 \times 10^{-2}$ in a temperature range of from 20° to 50° C.

The running durability of the above-obtained 3.5 inch floppy disk sample was evaluated in an ambience of 60° C. and 30% RH as follows.

The floppy disk sample was allowed to continuously run at a speed of 360 rpm by means of a 3.5 inch floppy disk drive, FD1135-D (manufactored by NEC Corporation, Japan), and the running durability was evaluated in terms of the number of passes required for the output to decrease to 80% of the initial value.

As a result, the magnetic disk of this invention showed no abnormality in running even when the number of passes had amounted to 25,000,000.

COMPARATIVE EXAMPLE

A 3.5 inch floppy disk sample was prepared under the same condition as in the above Example except that 9.3 parts of nitrocellulose (RS ½, manufactured by Daicel Chemical Industries, Ltd., Japan) was used in place of the vinyl chloride-vinyl acetate copolymer containing —COOH group and 21.7 parts of polyurethane N-2304 (manufactured by Nippon Polyurethane Industry Co., Ltd., Japan) was used in place of the polyester polyurethane, and polyisocyanate was not used.

The mechanical loss tangent, tan δ, of the above-obtained disk sample as measured in a temperature range of from 20° to 50° C. under the same conditions as in the Example, and was found to vary from 0.08 to 0.11.

Further, the running durability was also evaluated at 60° C. and 30% RH under the same conditions as in the Example. As a result, the output was decreased to 80% or less of the initial value when the number of passes amounted to 11,000,000, and it was found that the surface of the magnetic layer had suffered a damage due to the liner in the disk jacket.

While the invention has been described in detail and with reference to specific embodiments thereof, it will be apparent to one skilled in the art that various changes and modifications can be made therein without departing from the spirit and scope thereof.

What is claimed is:

1. A magnetic disk comprising a nonmagnetic support having provided thereon a magnetic layer comprising particles of a ferromagnetic metal powder and a binder resin, wherein said magnetic layer has a mechanical loss tangent, tan δ, of from $8 \times 10^{-3}$ to $6 \times 10^{-2}$, measured at a frequency of 110 Hz in a temperature range of from 20° to 50° C. with a temperature increase rate of 2 deg/-min. wherein the particles of the ferromagnetic powder have a specific surface area of 40 m²/g or more and a crystallite size of 400 Å or less.

2. The magnetic disk according to claim 1, wherein the ferromagnetic metal powder is a powder of a metal or an alloy composed of Fe, Fe-Co, Fe-Ni or Fe-Co-Ni.

3. The magnetic disk of claim 2, wherein the ferromagnetic powder includes an element selected from the group consisting of B, C, Al, Si and P.

4. The magnetic disk of claim 1, wherein the surfaces of the ferromagnetic metal powder particles are covered with a layer of an oxide.

5. The magnetic disk of claim 1, wherein the particles of the ferromagnetic powder have a ratio of axial length to axial width of 5 or more, a saturated magnetization of 110 emu/g or more and a coercive force of 800 Oe or more.

6. The magnetic disk of claim 1, wherein the binder resin is a thermoplastic resin, a thermosetting resin, a reactive binder resin or a mixture of at least two thereof.

7. The magnetic disk of claim 1, wherein the binder resin is present in the magnetic layer in an amount of 5 to 300 parts by weight per 100 parts by weight of the ferromagnetic metal powder.

8. The magnetic disk of claim 1, wherein the binder resin includes a functional group selected from a carboxyl group, a metal salt of a carboxyl group, a sulfonic group, a metal salt of a sulfonic group, hydroxy group and an amino group or an epoxy group in the molecule thereof.

9. The magnetic disk of claim 1, wherein the thickness of the magnetic layer is from 0.5 to 12 μm.

10. The magnetic disk of claim 1, wherein the binder resin comprises:
   (1) a vinyl chloride copolymer having, in its molecule, a polar functional group such as —COOM or —SO₃M, wherein M represents a hydrogen atom or a metal atom,
   (2) a polyurethane resin having at least two —OH groups per molecule, and
   (3) a trifunctional polyisocyanate, wherein after forming said magnetic disk, said magnetic disk is subjected to a heat and moisture treatment at a temperature of from 60° to 85° C. and an absolute humidity of 0.07 kg H₂O/kg-dry air or more.

11. The magnetic disk of claim 10, wherein the trifunctional polyisocyante is an addition product formed through the reaction of 1 mol of trimethylpropane with 3 mols of tolylene diisocyanate.

* * * * *